T. TULLY.
Tire Shrinking Machine.

No. 57,410.  Patented Aug. 21, 1866.

Witnesses.  Inventor.

UNITED STATES PATENT OFFICE.

THOMAS TULLY, OF LITCHFIELD, ILLINOIS.

IMPROVEMENT IN TIRE-SHRINKING MACHINES.

Specification forming part of Letters Patent No. 57,410, dated August 21, 1866.

*To all whom it may concern:*

Be it known that I, THOMAS TULLY, of Litchfield, in the county of Montgomery and State of Illinois, have invented a new and Improved Tire Shrinking and Punching Device; and I do hereby declare that the following is a full, clear, and exact description thereof, which will enable others skilled in the art to make and use the same, reference being had to the accompanying drawings, forming part of this specification, in which—

Figure 1:
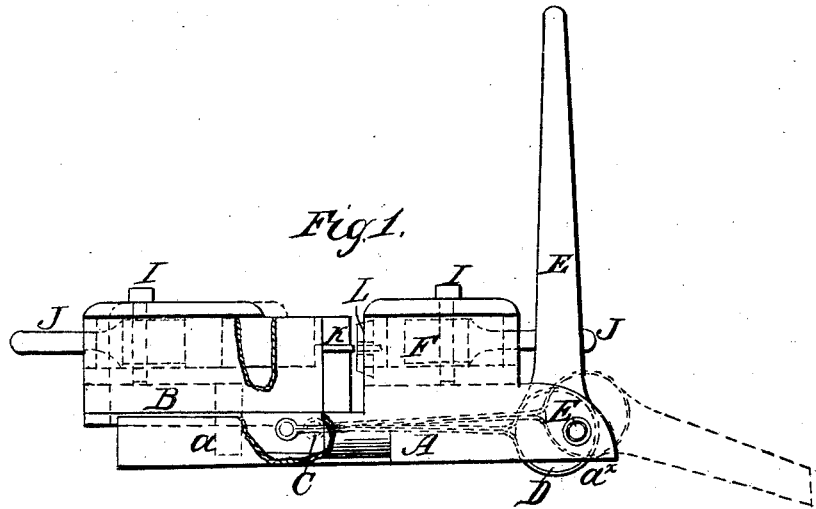
Figure 2:
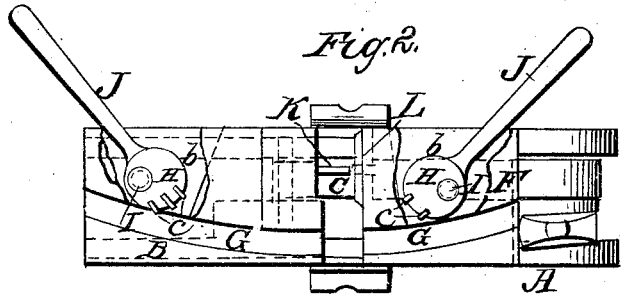

Figure 1 is a side view of my invention, partly in section; Fig. 2, a sectional plan or top view of the same.

Similar letters of reference indicate like parts.

This invention relates to a new and improved device for shrinking tires, in order to contract the same without cutting and rewelding, in order that they may fit the wheels to which they are designed to be applied, the machine being so constructed that wagon-tires of any thickness or width, as well as light tires, can be upset or shrunk without adjusting the machinery or any of its parts, and also for punching various-sized holes in different articles.

A represents a bed-plate or framing, the sides $a$ of which form ways or guides to receive a block, B, which is connected by a bar, C, to an eccentric, D, on a shaft, E, the latter passing transversely through one end of the bed-plate.

The bar C is connected to the eccentric D by a strap, $a^x$, which may be formed by bending the bar around it, and the eccentric has a handle or lever, E, projecting from it, by which the eccentric is turned.

F represents a block, which is similar to the block B, but is immovable, being permanently attached to the bed-plate. Each block has a curved recess or groove, G, made in it, the grooves of the two blocks being in line with each other, and forming a portion of a circle corresponding with the tire to be operated upon. These grooves are for the purpose of keeping the tire in a proper shape and prevent it from kinking.

In each of the blocks B F there is an opening, $b$, in which an eccentric dog, H, is fitted. These dogs work on pins I, and are provided with handles J, as shown clearly in Fig. 2.

The dogs H are provided with steel teeth $c$, any suitable number being employed. These steel teeth are cast into the solid cast-iron heads of dogs H.

The tire to be shrunk or contracted is heated at any point, and the heated portion placed in the grooves G of the blocks B F. By raising the lever the block B is moved out from the fixed block F. The tire is grasped by the dogs H, and the block B is then, by actuating the lever E, brought toward the fixed block F, and the heated portion of the tire is upset or contracted. The dogs, under this latter movement of the block B, have a tendency to grasp the tire firmly, so as to prevent the contingency of slipping.

In the end of the block B which is opposite the end of the fixed block F there is inserted a punch, K, which works in a bolster-plate, L, at the end of the block F. By having various-sized punches and corresponding bolster-plates holes of any required size can be punched. The punching is done by operating or moving the block B in the same way, or by the same means employed for the upsetting of the tire. When required, an eccentric of greater power than that employed for upsetting the tire can be used for punching.

Having thus described my invention, I claim as new and desire to secure by Letters Patent—

The combination of the curved grooves G G, eccentric dogs H H, eccentric lever D E, and fixed and sliding blocks F and B, when constructed and arranged to operate as and for the purposes herein specified.

THOMAS TULLY.

Witnesses:
P. G. BARTON,
B. F. MOSSMAN.